US008018865B2

(12) United States Patent
Fan et al.

(10) Patent No.: US 8,018,865 B2
(45) Date of Patent: Sep. 13, 2011

(54) METHOD FOR GSM AND CDMA DUAL-MODE MOBILE PHONE TO CONTROL TWO GSM SUBSCRIBER IDENTIFICATION MODULES

(75) Inventors: Xiao-Long Fan, Naking (CN); Xing-Jun Zhang, Nanking (CN)

(73) Assignee: Inventec Appliances Corp., Taipei (TW)

( * ) Notice: Subject to any disclaimer, the term of this patent is extended or adjusted under 35 U.S.C. 154(b) by 754 days.

(21) Appl. No.: 12/143,476

(22) Filed: Jun. 20, 2008

(65) Prior Publication Data

US 2008/0318621 A1    Dec. 25, 2008

(30) Foreign Application Priority Data

Jun. 20, 2007  (TW) .............................. 96122392 A (51) Int. Cl.
*G01R 31/08* (2006.01)
*G06F 11/00* (2006.01)
*G06F 3/00* (2006.01)
*H04B 7/216* (2006.01)
*H04J 13/00* (2011.01)
*H04M 11/00* (2006.01)
*H04M 1/00* (2006.01)
*H04B 1/38* (2006.01)
*H01Q 11/12* (2006.01)

(52) U.S. Cl. ........ 370/252; 370/335; 370/342; 370/441; 370/479; 455/403; 455/552.1; 455/558; 455/127.4; 710/14

(58) Field of Classification Search .................. None
See application file for complete search history.

(56) References Cited

U.S. PATENT DOCUMENTS

| 5,987,325 | A  | * | 11/1999 | Tayloe ........................ 455/435.2 |
| 7,814,237 | B2 | * | 10/2010 | Lee et al. ......................... 710/14 |
| 2002/0154632 | A1 | * | 10/2002 | Wang et al. .................... 370/389 |
| 2003/0153356 | A1 | * | 8/2003 | Liu ................................ 455/558 |
| 2006/0105812 | A1 | * | 5/2006 | Shin .............................. 455/558 |

* cited by examiner

*Primary Examiner* — Chirag Shah
*Assistant Examiner* — Ashley Shivers
(74) *Attorney, Agent, or Firm* — Muncy, Geissler, Olds & Lowe, PLLC (57) ABSTRACT

A method for a GSM/CDMA dual-mode mobile phone to control two GSM subscriber identification modules is provided. Without changing hardware of the GSM/CDMA dual-mode mobile phone, the method uses a GSM control module to operate a first GSM subscriber identification module, and a CDMA UART driver module and a SIM/UIM driver module connected with each other are built in a CDMA control module. The CDMA URAT driver module is communicated with a GSM device driver layer of the GSM control module through a UART standard, such that the GSM control module is able to control a second GSM subscriber identification module connected to the SIM/UIM driver module. Thus, the GSM/CDMA dual-mode mobile phone is able to control two GSM subscriber identification modules so as to satisfy needs and demands for businessmen and lovers in personal style.

9 Claims, 6 Drawing Sheets

METHOD FOR GSM AND CDMA DUAL-MODE MOBILE PHONE TO CONTROL TWO GSM SUBSCRIBER IDENTIFICATION MODULES

CLAIM FOR PRIORITY

This application claims the benefit of Taiwan Patent Application No. 096122392, filed on Jun. 20, 2007, which is hereby incorporated by reference for all purposes as if fully set forth.

BACKGROUND OF THE INVENTION

1. Field of Invention

The present invention relates to a method for controlling two GSM subscriber identification modules, and more particularly to a method for a GSM/CDMA dual-mode mobile phone to control two GSM subscriber identification modules.

2. Related Art

Currently, many specifications and standards are developed for wireless telecommunications. Common wireless telecommunications systems include global system for mobile communication (GSM), code division multiple access (CDMA), and personal handy-phone system (PHS). To cater users' requirements for a mobile phone capable of switching between different specification and standard systems, the mobile phone manufacturers have developed dual-mode mobile phones, for example, mobile phones with both GSM and CDMA systems.

Figure 1:
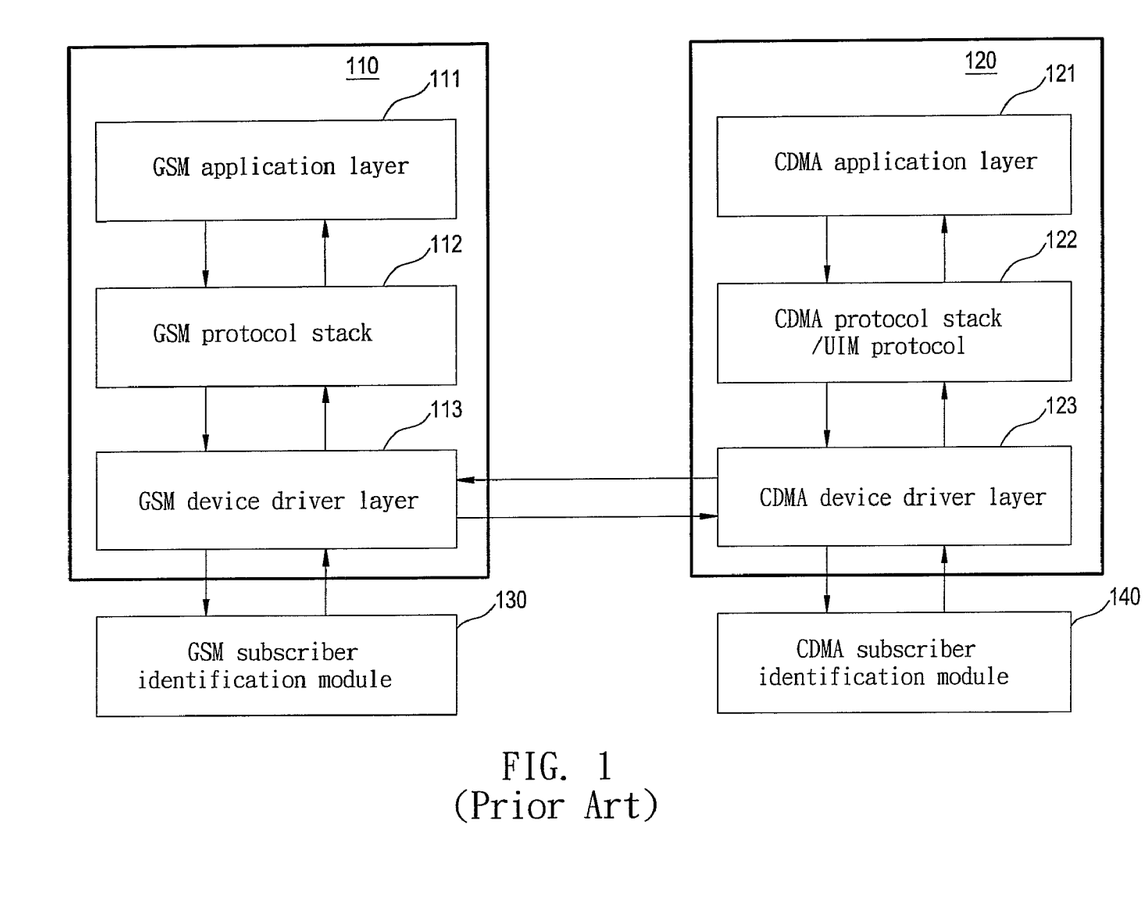
FIG. 1 is a system architectural view of a GSM/CDMA dual-mode mobile phone of the prior art.

FIG. 1 shows architecture of a GSM/CDMA dual-mode system of the prior art. Referring to FIG. 1, regarding the operating manner of this architecture, a GSM control module 110 may control a GSM subscriber identification module 130 that is electrically connected to a subscriber identification module (SIM) card. In addition, the GSM control module 110 may control a CDMA subscriber identification module 140 through a CDMA control module 120. The GSM control module 110 uses a GSM application layer 111 to provide a control command to a GSM device driver layer 113 through a GSM protocol stack 112. The GSM device driver layer 113 then outputs the control command to a CDMA device driver layer 123 of the CDMA control module 120 through a universal asynchronous receiver/transmitter (UART) standard. Then, the control command is transmitted to a CDMA application layer 121 of the CDMA control module 120 through a CDMA protocol stack/UIM protocol 122.

The CDMA application layer 121 further determines whether the control command is valid. If the control command is determined to be valid, the CDMA application layer 121 transmits the control command to the CDMA device driver layer 123 through the media of the CDMA protocol stack/UIM protocol 122 and the CDMA device driver layer 123 read the raw data of the CDMA subscriber identification module 140. The CDMA subscriber identification module 140 is electrically coupled to a user identity module (UIM) card. Then, the raw data of the CDMA subscriber identification module 140 is returned to the CDMA application layer 121 through the UIM protocol of the CDMA control module 120 in response to the control command.

Finally, the CDMA application layer 121 invokes the CDMA device driver layer 123 again to transmit the raw data to the GSM device driver layer 113 through the UART standard, and returns the raw data to the GSM application layer 111 through the GSM protocol stack 112. The GSM application layer 111 processes the returned raw data.

However, the prior art has the following unavoidable disadvantage. The GSM/CDMA dual-mode mobile phone is not adapted for a user having two GSM subscriber identification modules, that is, a user having two SIM cards. To use the dual-mode function of the GSM/CDMA dual-mode mobile phone, the user is required have a SIM card and a UIM card respectively corresponding to a GSM number and a CDMA number. To use two SIM cards corresponding to two GSM numbers, the user must buy another mobile phone for inserting the SIM card. Therefore, the mobile phone cannot meet the requirements of a user who does not have a CDMA number but has two GSM numbers. Therefore, the practicability of the GSM/CDMA dual-mode mobile phone is reduced.

SUMMARY OF THE INVENTION

Accordingly, the present invention is directed to a method for a GSM (global system for mobile communication)/CDMA (code division multiple access) dual-mode mobile phone to control two GSM subscriber identification modules, such that the GSM/CDMA dual-mode mobile phone can use two GSM subscriber identification modules of two different numbers without any changes to hardware.

The present invention discloses a method for enabling a GSM/CDMA dual-mode mobile phone to control two GSM subscriber identification modules which are of a first GSM subscriber identification module and a second GSM subscriber identification module. The GSM/CDMA dual-mode mobile phone includes a GSM control module and a CDMA control module. After the initialization of the operation system of a mobile phone, the GSM/CDMA dual-mode mobile phone determines whether a standby mode is going to be entered by the second GSM subscriber identification module of a CDMA control module. If it is, the second GSM subscriber identification module enters the standby mode, the dual-mode mobile phone sets up a CDMA universal asynchronous receiver/transmitter driver module (CDMA UART driver module) and a SIM/UIM driver module connected with CDMA UART driver module on a CDMA device driver layer. The CDMA UART driver module is communicated with a GSM device driver layer of a GSM control module according to a UART standard to control the second GSM subscriber identification module connected to the SIM/UIM driver module. If the standby mode is not going to be entered by the second GSM subscriber identification module, the first GSM subscriber identification module enters the standby mode, and the dual-mode mobile phone uses the GSM control module to control the first GSM subscriber identification module connected to the GSM control module.

In addition, when the first GSM subscriber identification module or the second GSM subscriber identification module is in the standby mode, the GSM/CDMA dual-mode mobile phone can obtain and record a control command or setting information about the standby mode entered into by either the first GSM subscriber identification module or by the second GSM subscriber identification module. Then, the operation system of the mobile phone is reset for initialization. The information about the standby mode entered into by first GSM subscriber identification module or the second GSM subscriber identification module is stored in a flash memory, an EEPROM or an EPROM.

The first GSM subscriber identification module is electrically coupled to a first subscriber identification module (SIM) card for reading data in the first SIM card. The second GSM subscriber identification module is electrically coupled to a second SIM card for reading data in the second SIM card.

The present invention has an effect that cannot be achieved by the prior art, that is, the GSM/CDMA dual-mode mobile phone has two GSM subscriber identification modules of different numbers, and can be electrically coupled to two SIM cards corresponding to two GSM numbers. The GSM control module can control the first SIM card electrically coupled to the first GSM subscriber identification module and transmit the data. Furthermore, the GSM control module can work with the SIM/UIM driver module through the CDMA UART driver module to control the second SIM card electrically coupled to the second GSM subscriber identification module and transmit the data. Therefore, a user having two SIM cards can easily control the two GSM numbers, and can freely select any one of the GSM subscriber identification modules to enter the standby mode without any significant changes to the hardware architecture. In addition, the CDMA control module functions to forward data in the absence of the CDMA protocol stack and the UIM protocol. Therefore, the control program becomes less complicated, and the performance is indirectly improved. Moreover, the R&D time and the cost of mobile phone manufacturers are saved, so as to satisfy needs and demands for businessmen and lovers in personal style with the maximum extent.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The features and practices of the present invention will be illustrated in detail in the following preferred embodiments with reference to the accompanying drawings.

Figure 2:
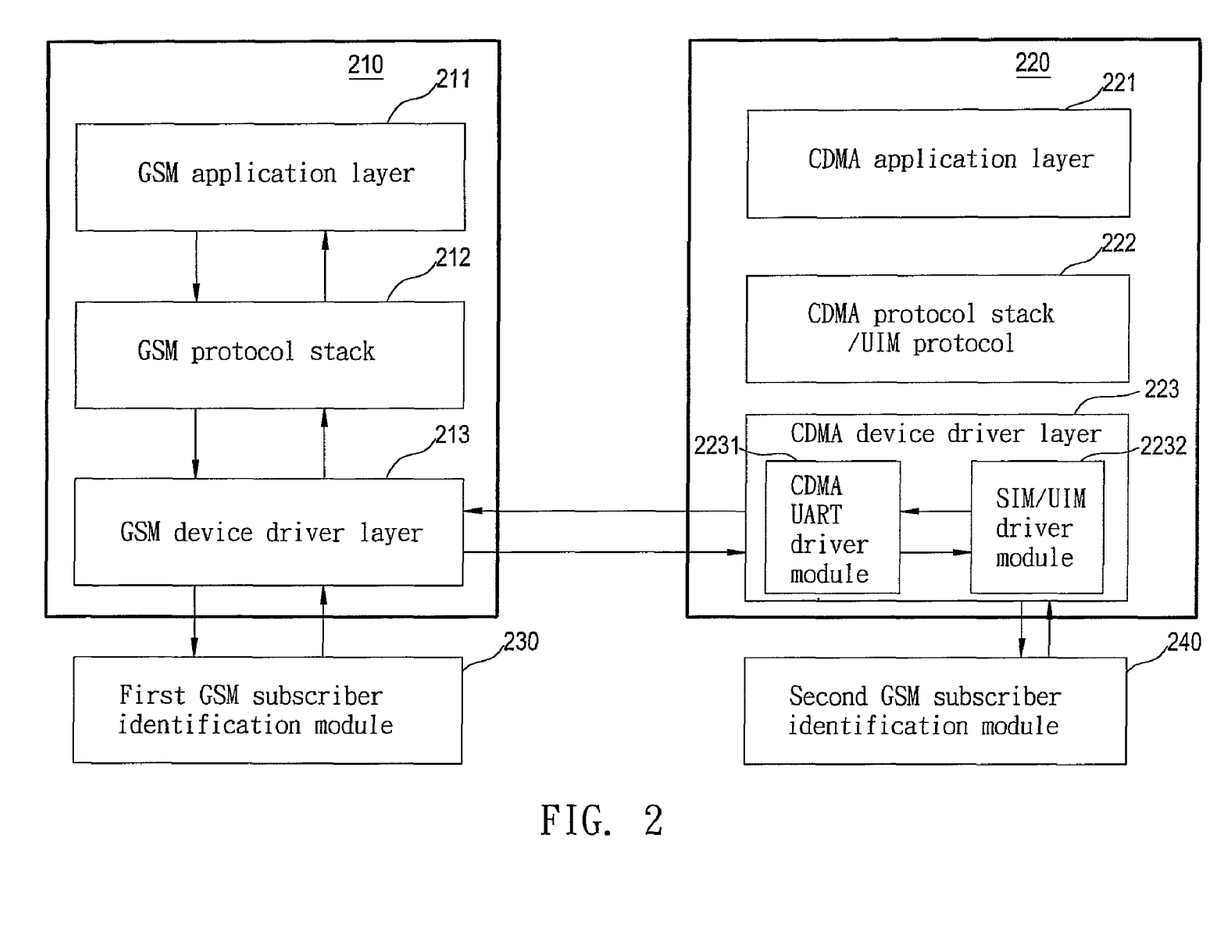
FIG. 2 is a system architectural view of controlling a first and a second GSM subscriber identification module according to an embodiment of the present invention.

FIG. 2 is a system architectural view for controlling the first and the second GSM subscriber identification module according to an embodiment of the present invention. Referring to FIG. 2, the system includes a global system for mobile communication (GSM) control module 210, a code division multiple access (CDMA) control module 220, a first GSM subscriber identification module 230, and a second GSM subscriber identification module 240. The GSM control module 210 includes a GSM application layer 211, a GSM protocol stack 212, and a GSM device driver layer 213. The CDMA control module 220 includes a CDMA application layer 221, a CDMA protocol stack/UIM stack 222, and a CDMA device driver layer 223. A CDMA universal asynchronous receiver/transmitter driver module (CDMA UART driver module) 2231 and a subscriber identification module (SIM) and a user identity module (UIM) driver module 2232 are built in the CDMA device driver layer 223.

The GSM device driver layer 213 is electrically coupled to the first GSM subscriber identification module 230. The CDMA UART driver module 2231 is connected to the SIM/UIM driver module 2232, and communicated with the GSM device driver layer 213. The second GSM subscriber identification module 240 is electrically coupled to the SIM/UIM driver module 2232.

According to the setting information about the standby mode entered by the first GSM subscriber identification module 230 or the second GSM subscriber identification module 240 stored in the dual-mode mobile phone, the system instructs the GSM application layer 211 of the GSM control module 210 to send a corresponding control command, so as to control the action of the first GSM subscriber identification module 230 through the GSM device driver layer 213 and transmit the data. Or, the GSM control module 210 sends the control command to the SIM/UIM driver module 2232 through the GSM device driver layer 213 and the CDMA UART driver module 2231, so as to control the action of the second GSM subscriber identification module 240 and transmit the data. When controlling the second GSM subscriber identification module 240, the GSM control module 210 controls the SIM/UIM driver module 2232 to perform simplex serial operation through the CDMA UART driver module 2231. Thus, the CDMA UART driver module 2231 can realize a part of the functions of the CDMA application layer 221 and the CDMA protocol stack/UIM protocol 222, therefore, the CDMA application layer 221, the CDMA protocol stack, and the UIM protocol are not required.

In this embodiment, the first GSM subscriber identification module 230 is electrically connected to a first SIM card (not shown). The second GSM subscriber identification module 240 is electrically connected to a second SIM card (not shown). In addition, the information transmission between the GSM device driver layer 213 and the CDMA UART driver module 2231 includes the collection and transmission of the control command and data through a UART standard.

Figure 3:
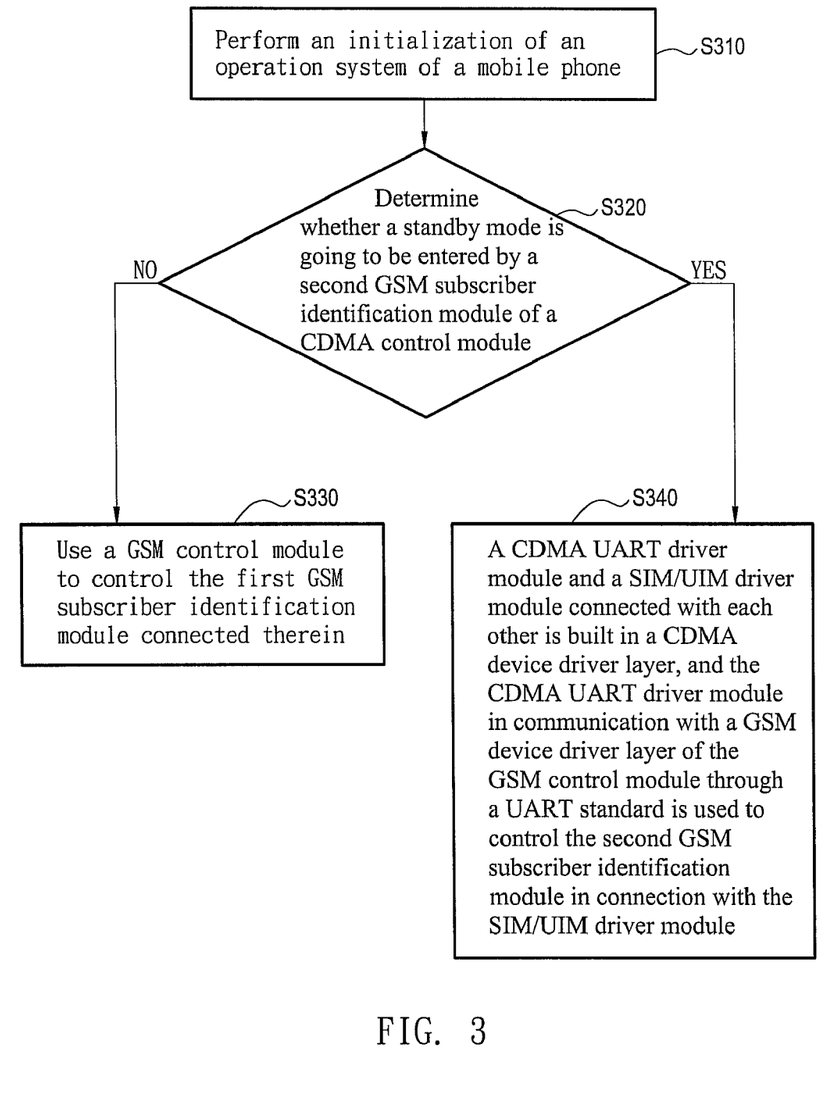
FIG. 3 is a flow chart of controlling the first and the second GSM subscriber identification module to enter the standby mode according to an embodiment of the present invention.

FIG. 3 is a systematic flow chart of the present invention. Referring to FIGS. 2 and 3, the process of the control method includes the following steps.

The initialization of an operation system of a mobile phone is performed (step S310). The initialization of the operation system is performed when the GSM/CDMA dual-mode mobile phone is either powered on or reset.

It is determined whether the standby mode is going to be entered by the second GSM subscriber identification module 240 connected to the CDMA control module 220 (step S320). The system retrieves the setting information of the standby situation to determine whether the standby mode is going to be entered by the second GSM subscriber identification module 240. The setting information of the standby situation is stored in a memory (not shown) of the GSM/CDMA dual-mode mobile phone, and the setting information of the standby situation refers to data stored in the memory about the standby mode entered into and by which GSM subscriber identification module. The memory can be a flash memory, an electrically erasable programmable read-only memory (EEPROM), or an erasable programmable read-only memory (EPROM).

If the standby mode is not going to be entered by the second GSM subscriber identification module 240, the first GSM subscriber identification module 230 enters the standby mode, and the dual-mode mobile phone uses the GSM control module 210 to control the first GSM subscriber identification module 230 connected to the GSM control module 210 (step S330).

On the contrary, if the determination result is yes in step S320, the second GSM subscriber identification module 240 enters the standby mode. The CDMA UART driver module 2231 and the SIM/UIM driver module 2232 connected with each other are built in the CDMA device driver layer 223, and the CDMA UART driver module 2231 communicates with the GSM device driver layer 213 of the GSM control module 210 through the UART standard, so as to control the second GSM subscriber identification module 240 connected to the SIM/UIM driver module 2232 (step S340).

Figure 4:
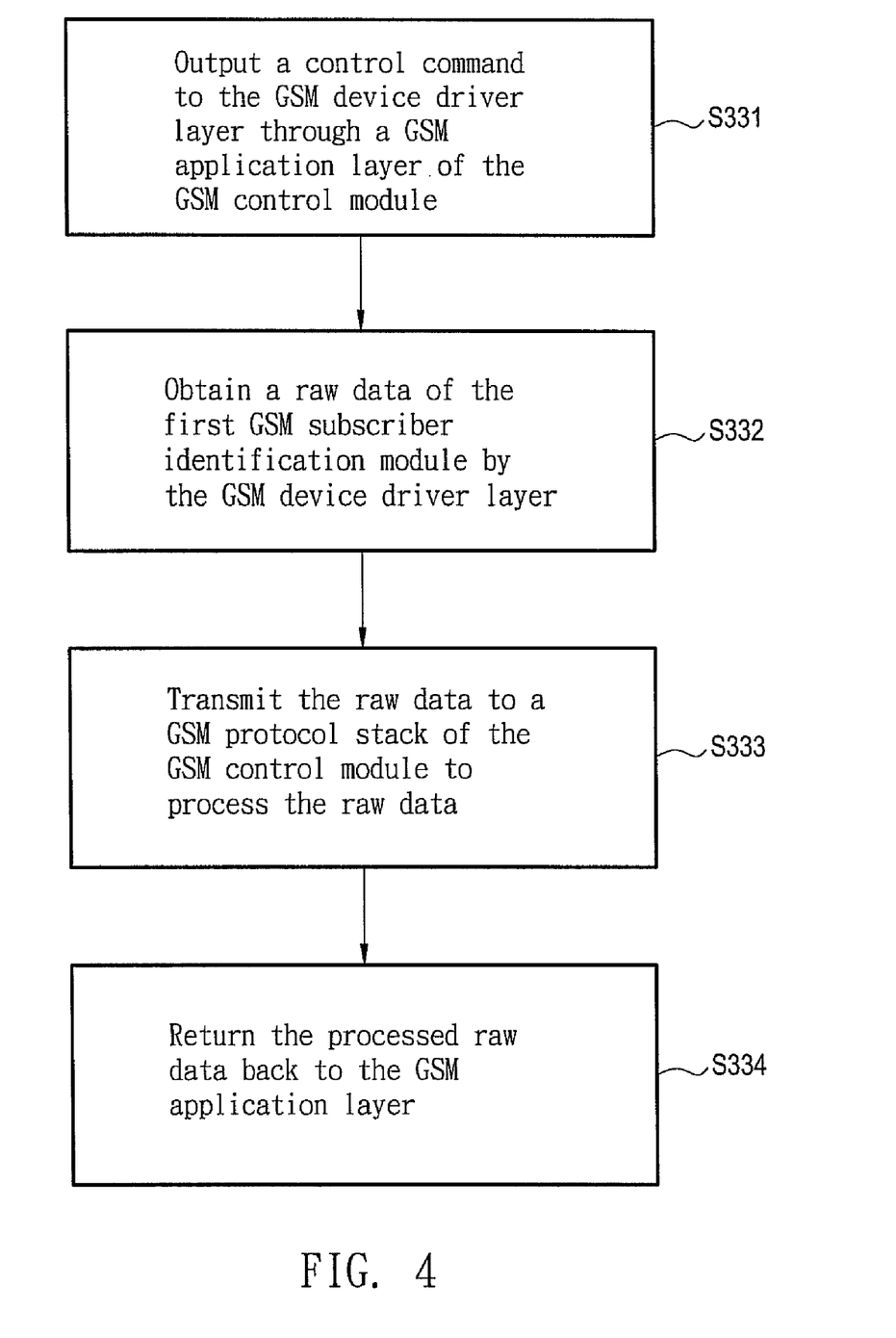
FIG. 4 is a flow chart showing details of the first GSM identification module of FIG. 3 entering the standby mode.

FIG. 4 is a flow chart showing details of the first GSM identification module of FIG. 3 entering the standby mode. Referring to FIG. 4, the system outputs a control command to the GSM device driver layer 213 through the GSM application layer 211 of the GSM control module 210 (step S331). When the GSM control module 210 sends the control command through the GSM application layer 211, the GSM protocol stack 212 is used to process the control command and to output the processed control command to the GSM device driver layer 213. According to the control command, the GSM device driver layer 213 obtains the raw data of the first GSM subscriber identification module 230 (step S332). Then, the GSM device driver layer 213 returns the raw data to the GSM protocol stack 212, and the GSM protocol stack 212 processes the raw data (step S333). Finally, the processed raw data is returned to the GSM application layer 211 (step S334). Thus, the GSM control module 210 completes the control and data reading of the first GSM subscriber identification module 230, and the first GSM subscriber identification module 230 enters the standby mode for the dual-mode mobile phone.

Figure 5:
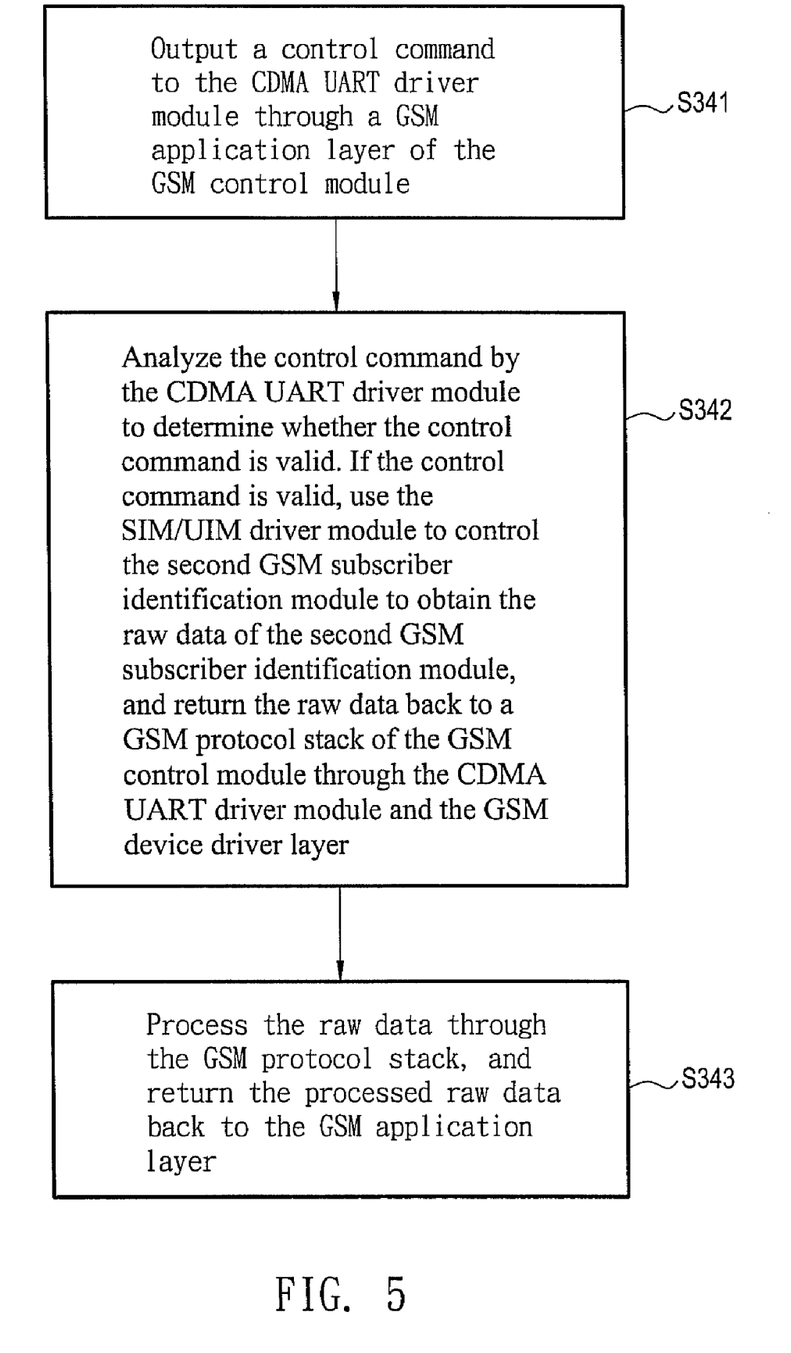
FIG. 5 is a flow chart showing details of the second GSM identification module of FIG. 3 entering the standby mode.

FIG. 5 is a flow chart showing details of the second GSM identification module of FIG. 3 entering the standby mode. The system outputs a control command to the CDMA UART driver module 2231 through the GSM application layer 211 of the GSM control module 210 (step S341). When the system outputs the control command through the GSM application layer 211 of the GSM control module 210, the GSM protocol stack 212 of the GSM control module 210 is used to process and output the control command, and the GSM device driver layer 213 is used to transmit the control command to the CDMA UART driver module 2231. When the control command is output from the GSM device driver layer 213, the data transmission is performed according to the UART standard. Then, the CDMA UART driver module 2231 is used to resolve the control command and to determine whether the control command is valid. If the control command is valid, the SIM/UIM driver module 2232 is used to control the second GSM subscriber identification module 240 and to obtain the raw data of the second GSM subscriber identification module 240. Then, the raw data is returned to the GSM protocol stack 212 of the GSM control module 210 through the CDMA UART driver module 2231 and the GSM device driver layer 213 (step S342).

Before step S342, the CDMA control module 220 configures its operating clock and operating voltage to values in conformity with the electrical features and standards of the second GSM subscriber identification module 240 according to the control command, and the second GSM subscriber identification module 240 is initialized, so as to control the second GSM subscriber identification module 240 and perform the data transmission. However, as the operation that the CDMA protocol stack/UIM protocol 222 performs on the second subscriber identification module 240 is a simplex serial operation, the CDMA UART driver module 2231 can realize a part of the functions of the CDMA protocol stack/UIM protocol 222, and can control the second subscriber identification module 240 through the SIM/UIM driver module 2232.

During the process of returning the raw data, the SIM/UIM driver module 2232 sends the raw data to the CDMA UART driver module 2231 first, and then the CDMA UART driver module 2231 sends the raw data to the GSM device driver layer 213 at a certain baud rate through the UART standard. At this time, the action of the CDMA control module 220 is data transmission. After that, the GSM device driver layer 213 sends the raw data the GSM protocol stack 212. Finally, the GSM protocol stack 212 processes the raw data, and returns the processed raw data to the GSM application layer 211 (step S343). The GSM application layer 211 processes the returned raw data. Thus, the GSM application layer 211 realizes the preliminary control on the second GSM subscriber identification module 240, and meanwhile, the second GSM subscriber identification module 240 enters the standby mode. The user can control the second GSM subscriber identification module 240 through the GSM application layer 211, and transmit the data.

Figure 6:
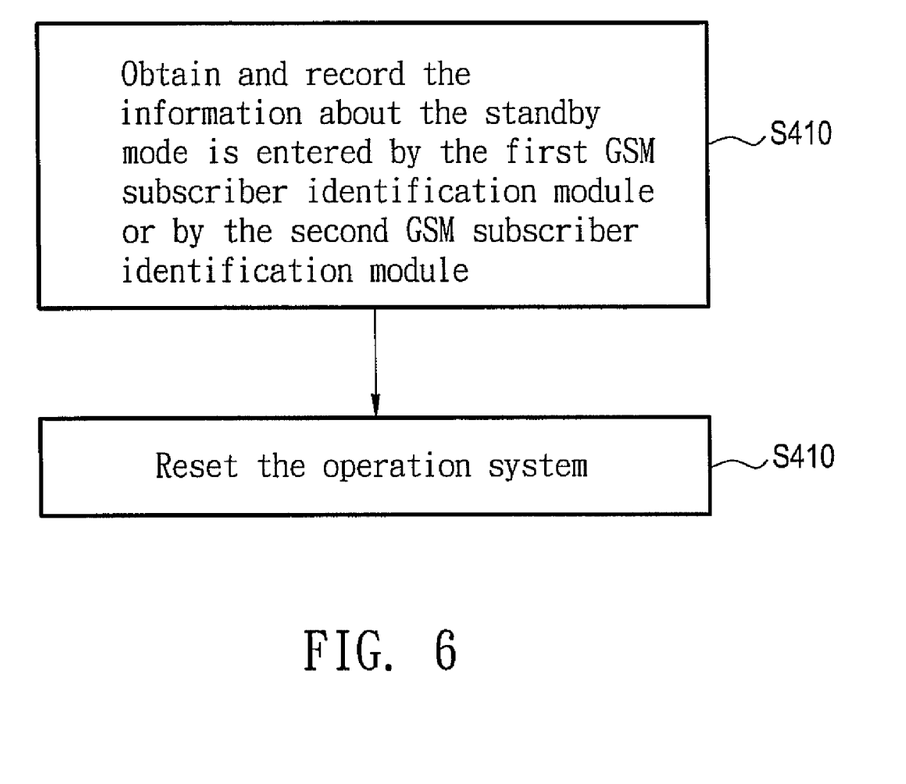
FIG. 6 is a flow chart of selecting and recording the first and the second GSM subscriber identification module to enter the standby mode according to an embodiment of the present invention.

FIG. 6 is a flow chart showing the way the user selects the first or the second GSM subscriber identification module to enter the standby mode and records the process according to an embodiment of the present invention. Referring to FIG. 6, the process includes the following steps.

The information about whether the first GSM subscriber identification module 230 or the second GSM subscriber identification module 240 enters the standby mode is obtained and recorded (step S410). This step can be realized in a plurality of different ways, among which the most common one is to record flag data and store standby setting information.

When the user uses the GSM/CDMA dual-mode mobile phone, delivers the control command to switches between the first GSM subscriber identification module 230 and the second GSM subscriber identification module 240 that enter the standby mode or selects one of them to enter the standby mode, the system retrieves the control command, and writes a flag data into or stores the standby setting information about the first GSM subscriber identification module or the second GSM subscriber identification module that the user wants to use in the memory according to the information included in the control command.

The operation system of the mobile phone is reset (step S420). After the operation system is reset (or the GSM/CDMA dual-mode mobile phone is restarted), the flag data or standby setting information stored in the memory is read to determine and drive the GSM control module 210 to read the raw data of the first GSM subscriber identification module 230 or the second GSM subscriber identification module 240, so as to enter the standby mode of the first GSM subscriber identification module 230 or the second GSM subscriber identification module 240.

To sum up, the system and method for enabling a GSM/CDMA dual-mode mobile phone to control two GSM subscriber identification modules of the present invention do not need to change the hardware of the mobile phone, and can control the second GSM subscriber identification module through the cooperation between the GSM control module, the CDMA UART driver module, and the SIM/UIM driver module. Thus, the user can control and switch between the two SIM cards of different GSM numbers to enter the standby mode, which improves the utility of the GSM/CDMA dual-mode mobile phone.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for a GSM (global system for mobile telecommunication) and CDMA (code division multiple access) dual-mode mobile phone to control two GSM subscriber identification modules which are of a first GSM subscriber identification module and a second GSM subscriber identification module, comprising:

initializing an operation system of the mobile phone;

determining whether a standby mode is going to be entered by the second GSM subscriber identification module of a CDMA control module; when the standby mode is not going to be entered by the second GSM subscriber identification module, the first GSM subscriber identification module entering the standby mode and a GSM control module being used to control the first GSM subscriber identification module connected therein; when the standby mode is going to be entered by the second GSM subscriber identification module, the second GSM subscriber identification module entering the standby mode accordingly, a CDMA UART (universal asynchronous receiver/transmitter) driver module and a SIM (subscriber identification module) and UIM (user identity module) driver module connected with each other being built in a CDMA device driver layer; and the CDMA UART driver module in communication with a GSM device driver layer of the GSM control module through a UART standard being used to control the second GSM subscriber identification module in connection with the SIM and UIM driver module.

2. The method for controlling two GSM subscriber identification modules as claimed in claim 1, further comprising:

after finishing the step of determining whether a standby mode is going to be entered by the second GSM subscriber identification module of a CDMA control module, obtaining and recording an information about the standby mode is entered by the first GSM subscriber identification module or by the second GSM subscriber identification module; and resetting the operation system.

3. The method for controlling two GSM subscriber identification modules as claimed in claim 2, wherein the information are stored in a flash memory, an EEPROM, or an EPROM.

4. The method for controlling two GSM subscriber identification modules as claimed in claim 1, wherein the step of the first GSM subscriber identification module entering the standby mode further comprises:

outputting a control command to the GSM device driver layer through a GSM application layer of the GSM control module;

obtaining a raw data of the first GSM subscriber identification module by the GSM device driver layer;

transmitting the raw data to a GSM protocol stack of the GSM control module to process the raw data; and returning the processed raw data back to the GSM application layer.

5. The method for controlling two GSM subscriber identification modules as claimed in claim 4, wherein the step of outputting the control command to the GSM device driver layer through the GSM application layer of the GSM control module further comprises:

processing the control command by the GSM protocol stack; and outputting the processed control command to the GSM device driver layer.

6. The method for controlling two GSM subscriber identification modules as claimed in claim 1, wherein the step of the second GSM subscriber identification module entering the standby mode further comprises:

outputting a control command to the CDMA UART driver module through a GSM application layer of the GSM control module;

analyzing the control command by the CDMA UART driver module to determine whether the control command is valid;

when the control command is valid, using the SIM and UIM driver module to control the second GSM subscriber identification module to obtain the raw data of the second GSM subscriber identification module;

returning the raw data back to a GSM protocol stack of the GSM control module through the CDMA UART driver module and the GSM device driver layer; and processing the raw data through the GSM protocol stack, and returning the processed raw data back to the GSM application layer.

7. The method for controlling two GSM subscriber identification modules as claimed in claim 6, wherein the step of outputting the control command to the CDMA UART driver module through the GSM application layer of the GSM control module at least comprises:

outputting the control command through the GSM application layer of the GSM control module;

processing the control command by the GSM protocol stack of the GSM control module, and outputting the control command; and retrieving by the GSM device driver layer and transmitting the control command to the CDMA UART driver module.

8. The method for controlling two GSM subscriber identification modules as claimed in claim 1, wherein the first GSM subscriber identification module is electrically coupled to a first SIM card for reading a data of the first SIM card.

9. The method for controlling two GSM subscriber identification modules as claimed in claim 1, wherein the second GSM subscriber identification module is electrically coupled to a second SIM card for reading a data of the second SIM card.

* * * * *